Figure 1:
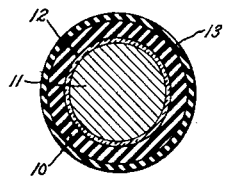

Nov. 16, 1954  C. J. HERMAN ET AL  2,694,650
INSULATED CONDUCTOR AND PROCESS OF MAKING SAME
Filed Feb. 17, 1951

Inventors:
Clairmont J. Herman,
Ralph D. Hodges,
by Ernest C. Britton
Their Attorney.

United States Patent Office 2,694,650
Patented Nov. 16, 1954

2,694,650

INSULATED CONDUCTOR AND PROCESS OF MAKING SAME

Clairmont J. Herman and Ralph D. Hodges, Fort Wayne, Ind., assignors to General Electric Company, a corporation of New York Application February 17, 1951, Serial No. 211,486

10 Claims. (Cl. 117—75)

This invention relates to insulated conductors and more particularly to the magnet wire type of insulated conductor commonly employed to form a winding upon a magnetic core and forming a part of an electric device.

Frequently, such electric devices operate at relatively high temperatures and it is, therefore, important that the magnet wire employed as a winding therein should possess properties that adapt it to such high temperature conditions without failure of the insulation. It is also important and obviously desirable that the insulation on the magnet wire be of minimum thickness so that after being wound as a part of the device a minimum of space will be occupied by the insulation proper.

As to the first or high temperature resisting property, several organic compositions usually employed as magnet wire insulation may be used as an insulating covering or coating for moderate temperatures not in excess of 105° C. Most organic compositions if employed as insulation are characterized by a short life at temperatures of about 150° C. On the other hand, there have been applications such as in the armatures of electric motors where the operating temperature has reached and even exceeded a temperature of 200° C. In so far as ability to successfully resist this temperature as well as higher temperatures is concerned, the fluorocarbons such as polymerized tetrafluoroethylene are well known and ideally suited for employment as a high temperature wire insulation. Aside from their satisfactory high temperature resistant characteristic, however, the fluorocarbons, unfortunately, do have undesirable properties which have prevented their extensive use as a magnet wire insulation especially where the conservation of space occupied by the insulation is an important factor. For example, the low abrasive resistance of fluorocarbons does not render conductors or wire insulated therewith adaptable to winding on automatic winding machines. In addition, solid fluorocarbons have a high degree of cold flow so that even under moderate pressures of winding, forming and placing of coils, metallic conductors which press against the polymer cause it to flow and thereby cause a short circuit. Moreover, solid polymerized fluorocarbons are notoriously inert and it is very difficult to bind windings together because the known varnishes do not adhere to their surfaces. Nevertheless, because of their excellent high temperature characteristics, it would be desirable to employ magnet wire insulated with a fluorocarbon composition provided its undesirable characteristics could be overcome without at the same time introducing a new disadvantage such as an undesirable increase in the bulk of the insulating coating or the space occupied thereby. It is, therefore, an object of this invention to provide an insulated conductor having insulation thereon adapted for winding on automatic winding machines and capable of withstanding an operating service temperature of at least 200° C.

It is a further object of this invention to provide a conductor insulated with a fluorocarbon composition and at the same time provide such an insulated conductor which is adapted to automatic winding machine applications and the application of insulating varnishes thereto subsequent to winding.

It is also an object of this invention to provide a fluorocarbon insulated conductor having abrasive resistant and cold flow resistant characteristics which will adapt it to winding applications.

It is also an object of our invention to provide an electric device wound with magnet wire having insulation thereon which occupies a minimum of space and is capable of withstanding a temperature of 200° C.

Figure 3:
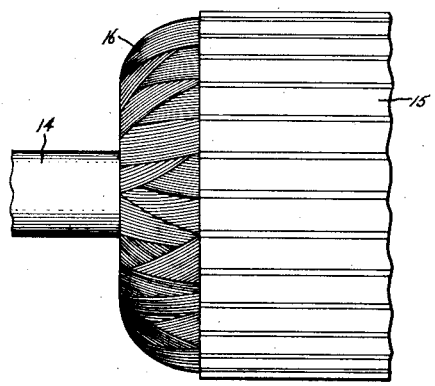
Figure 2:
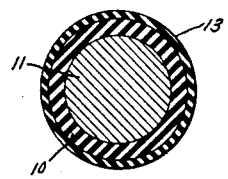

Additional objects and features of the invention will become apparent from the following description and with reference to the accompanying drawing in which Figs. 1 and 2 illustrate cross-sectional views of insulated conductors embodying this invention and Fig. 3 illustrates a side elevation view of a portion of an electric device wound with insulated wire of the type illustrated by Figs. 1 or 2.

In approaching the problem of providing a magnet wire whereby all of the objectives of the invention would be realized, it was apparent that only a conductor or wire having insulation of the fluorocarbon type would be satisfactory at the expected operating temperature of at least 200° C. At the same time, it was also realized that in the absence of some sort of protection, application difficulties would be encountered since trials had shown that resistance to cold flow and abrasion during application of wire coated with only a fluorocarbon composition was so low that even when carefully handled short circuits in a finished winding could not be eliminated. At first glance, it might seem plausible that a protective coating of some other more abrasive resistant material over the fluorocarbon coating would solve the problem. For example, it is well known that an inorganic fibrous material comprising glass or asbestos fibers is suitable for operating temperatures in excess of 200° C. It is also known that outer wrappings of such inorganic fibrous materials have been employed to confine and thus prevent flowing of an inner coating or wrapping of a polymerized fluorocarbon directly applied to a conductor. However, outer wrappings of such inorganic fibrous materials result in a minimum outer wrapping thickness of .0015 inch or a minimum increase of .003 inch (3 mils) in the over-all wire diameter. This comparatively large diameter increase adversely affects the space factor of the finished wire and, therefore, cannot be tolerated for certain applications. On the other hand, because of the well known fact that no known material will bond to a solid polymerized fluorocarbon, it was not expected that a very thin protective coating of any known material in the liquid state which would subsequently solidify upon the application of heat, and at the same time possess the abrasive resistant and mechanical strength properties required, could be applied by passing a fluorocarbon insulated wire through a bath of such liquid which is a well known technique for the application of insulating enamels to wire. Furthermore, because of the expected high service temperatures to be encountered, those skilled in the art believed that any such material must have characteristics suitable to withstand such temperatures.

Nevertheless, and quite unexpectedly, we have discovered that a conductor insulated with a solid coating of a fluorocarbon composition for high temperature purposes may not only be subsequently coated with an extremely thin outer layer of an insulating enamel, based on a polyvinyl resin, while in the liquid state, but, in addition, we have discovered that the resulting combination constitutes an insulated magnet wire which has the required properties of excellent abrasive resistance and the ability to confine the undercoating of fluorocarbon against the tendency to cold flow during the winding operation and, after being subsequently wound, the resulting winding is one to which the commonly employed insulating varnishes will thereafter adhere or bond when eventually dipped and baked.

In accordance with this invention, a metallic conductor or wire is passed through a bath or suspension of one of the polymerized fluorocarbons, such as monochlorotrifluoroethylene or tetrafluoroethylene whereby, after subsequent heat treatment to fuse the polymerized fluorocarbon into a solid mass, the wire is provided with a continuous coating or layer of a high temperature resistant insulation. Such a coating 10 may be applied to a bare conductor 11, as illustrated by Fig. 2, or may be applied to a wire which has previously had applied to it an inorganic ceramic or oxide coating 12, as illustrated by Fig. 1. In either event, of course, a plurality of layers or coatings of the fluorocarbon may be applied by recirculating or passing the wire several times through the bath and dies with subsequent heat treatment after each pass in a manner well understood to those skilled in the art. Thereafter, the wire with the fluorocarbon coating, is drawn through a bath of one of the well known wire enamels based on a polyvinylal resin and then through a die, whereby, after subsequent heat treatment, the wire is provided with a solid polyvinylal resin protective coating or layer 13. Of the various polyvinylal resins, a coating of a polyvinylal phenol formaldehyde resin is preferred for the particular applications discussed herein. The polyvinylal phenol formaldehyde wire enamel may be prepared by dissolving polyvinylal resin, a resin known to the trade as "Formvar No. 15-95E," and a phenol formaldehyde resin in suitable solvents.

Polyvinylal phenol formaldehyde resin outer coatings have been applied with a thickness, measured on the radius, of less than ½ mil, and, while this coating does not grip or bond to the fluorocarbon undercoating, it does form a continuous covering which is sufficiently abrasive resistant to protect the undercoating and withstand the pressures and abrasion encountered during any winding operation. Otherwise, and particularly as to expected high temperature operating conditions in excess of 200° C., wire coated with the combination of a solid polymeric fluorinated composition and a polyvinylal phenol formaldehyde resin as described is ideal notwithstanding the well known fact that polyvinylal phenol formaldehyde resins are not ordinarily any longer useful or adequate after having been subjected to a temperature in excess of 105° C. While the polyvinylal phenol formaldehyde resin coating, after being wound as a part of an electric device and subjected to 200° C., will oxidize and turn dark in color, it does not become conducting as expected, stays in place and continues to confine and hold the fluorocarbon insulation in a solid mass and thus the dielectric strength of the fluorocarbon coating is maintained. Compared to prior art fluorocarbon insulated magnet wire having a protective coating of inorganic fibrous material having a minimum thickness of .0015 inch which, of course, represents a minimum increase of .003 inch in the over-all diameter of the wire, we have produced magnet wire in accordance with our invention having an increase in overall diameter ranging from only .0007 to .001 inch or a maximum thickness ranging from .00035 to .0005 inch due to the polyvinylal phenol formaldehyde resin outer coating.

As a specific application of our insulated magnet wire, we have illustrated by Fig. 3 a portion of an electric device such as an armature for a motor or generator to be operated at a temperature of at least 200° C. and comprising a shaft 14, a core 15 mounted on the shaft, and a winding 16 consisting of our insulated magnet wire wound on the core 15.

Thus, by the combination of an inner insulating coating of a suitable fluorocarbon on a conductor for high temperature resistant purposes and an exceptionally thin outer coating of a polyvinylal phenol formaldehyde resin, we have provided an insulated magnet wire which is suitable for operating temperatures in excess of 200° C. notwithstanding the inadequacy by itself of one of the components of the combination in so far as ability to withstand such a temperature is concerned, and at the same time provided wire with insulation thereon which will occupy a minimum of space and is adapted to withstand the mechanical handling and pressures of automatic winding machine applications notwithstanding the inadequacies by itself of another component of the combination with regard to such application.

While we have, in accordance with the patent statutes, shown and disclosed a particular embodiment and application of our invention, changes and modifications will be obvious to those skilled in the art, and we aim in the appended claims to cover all such changes and modifications as fall within the true spirit and scope of our invention.

What we claim as new and desire to secure by Letters Patent of the United States is:

1. An insulated conductor comprising in combination a metallic conductor, an outer insulating layer of a polyvinylal resin and an inner layer of a solid polymeric fluorinated composition selected from the class consisting of monochlorotrifluoroethylene and tetrafluoroethylene immediately adjacent said outer layer.

2. An insulated conductor comprising in combination a metallic conductor, an outer layer of a polyvinylal phenol formaldehyde resin and an inner layer of a solid polymeric fluorinated composition selected from the class consisting of monochlorotrifluoroethylene and tetrafluoroethylene immediately adjacent said outer layer.

3. An insulated conductor comprising in combination a metallic conductor having an inorganic ceramic primary coating applied directly thereto, a solid polymeric fluorinated composition selected from the class consisting of monochlorotrifluoroethylene and tetrafluoroethylene applied to the primary coating of inorganic ceramic, and an exterior layer of a polyvinylal phenol formaldehyde resin.

4. An insulated conductor comprising in combination a metallic conductor, a solid polymeric fluorinated composition selected from the class consisting of monochlorotrifluoroethylene and tetrafluoroethylene applied to the conductor and an exterior layer of a polyvinylal resin.

5. An electric device comprising a core member and a winding suitable for a service operating temperature of at least 200° C. applied to said core member, said winding comprising in combination a metallic conductor, a solid polymeric fluorinated composition selected from the class consisting of monochlorotrifluoroethylene and tetrafluoroethylene applied to the conductor and an exterior layer of a polyvinylal resin.

6. An insulated conductor comprising in combination a metallic conductor, a solid polymeric fluorinated composition selected from the class consisting of monochlorotrifluoroethylene and tetrafluoroethylene applied to the conductor and an exterior layer of a polyvinylal resin, said exterior layer having a maximum wall thickness of .0005 inch.

7. An insulated magnet wire having a minimum thickness of insulation thereon to form a compact winding as part of an electric device to be subjected to a service operating temperature of at least 200° C. comprising in combination a metallic conductor, a solid polymeric fluorinated composition selected from the class consisting of monochlorotrifluoroethylene and tetrafluoroethylene applied to the conductor and an exterior layer of a polyvinylal resin, said exterior layer having a wall thickness ranging from .00035 to .0005 inch.

8. The method of making an insulated conductor comprising the steps of applying to a metallic conductor an undercoat of a solid polymeric fluorinated composition selected from the class consisting of monochlorotrifluoroethylene and tetrafluoroethylene, and applying an exterior layer of a polyvinylal resin over said undercoat.

9. The method of making an insulated conductor comprising the steps of applying an undercoat on a metallic conductor of a solid polymeric fluorinated composition selected from the class consisting of monochlorotrifluoroethylene and tetrafluoroethylene, heat treating said conductor thereby to fuse said composition into a solid mass, applying an exterior layer of a polyvinylal resin over said undercoat, and heat treating said wire thereby to cure said resin.

10. The method of making an insulated conductor comprising the steps of applying an undercoat to a metallic conductor of a solid polymeric fluorinated composition selected from the class consisting of monochlorotrifluoroethylene and tetrafluoroethylene, and applying an exterior layer less than .0005 inch thick of a polyvinylal resin over said undercoat.

References Cited in the file of this patent

UNITED STATES PATENTS

| Number | Name | Date |
| --- | --- | --- |
| 2,307,588 | Jackson | Jan. 5, 1943 |
| 2,406,319 | Brooks | Aug. 27, 1946 |
| 2,448,952 | Berry | Sept. 7, 1948 |
| 2,459,653 | Keyes | Jan. 18, 1949 |
| 2,484,484 | Berry | Oct. 11, 1949 |
| 2,497,046 | Kropa | Feb. 7, 1950 |
| 2,542,069 | Young | Feb. 20, 1951 |